(12) United States Patent
Jakobs et al.

(10) Patent No.: US 12,722,589 B2
(45) Date of Patent: Sep. 1, 2026

(54) TETHER MECHANISM FOR AN AIRBAG MODULE

(71) Applicant: Autoliv Development AB, Vargarda (SE)

(72) Inventors: Bernd Jakobs, Nuremberg (DE); Jörg Haesser, Gaimersheim (DE); Johann Unger, Dachau (DE); Oliver Adolph, Moorenweis (DE); Marc Schock, Karlsfeld (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 19/113,736

(22) PCT Filed: Sep. 19, 2023

(86) PCT No.: PCT/EP2023/075825

§ 371 (c)(1),
(2) Date: Mar. 20, 2025

(87) PCT Pub. No.: WO2024/061922

PCT Pub. Date: Mar. 28, 2024

(65) Prior Publication Data

US 2026/0097735 A1 Apr. 9, 2026

(30) Foreign Application Priority Data

Sep. 21, 2022 (DE) ..................... 10 2022 124 259.5

(51) Int. Cl.

| | |
|---|---|
| ***B60R 21/207*** | (2006.01) |
| ***B60R 21/2338*** | (2011.01) |
| *B60R 21/231* | (2011.01) |

(52) U.S. Cl.
CPC ........ *B60R 21/207* (2013.01); *B60R 21/2338* (2013.01); *B60R 2021/23107* (2013.01);
(Continued)

(58) Field of Classification Search
CPC .............. B60R 21/207; B60R 21/2338; B60R 21/23138; B60R 21/18; B60R 21/2334;
(Continued)

(56) References Cited

U.S. PATENT DOCUMENTS

| | | | |
|---|---|---|---|
| 4,015,860 A | 4/1977 | Tisell et al. | |
| 2007/0085318 A1* | 4/2007 | Stevens | B60R 22/1955 280/806 |

(Continued)

FOREIGN PATENT DOCUMENTS

| | | | |
|---|---|---|---|
| DE | 102014226745 A1 * | 6/2016 | B60R 21/231 |
| DE | 102015204099 A1 * | 9/2016 | B60R 21/18 |

(Continued)

*Primary Examiner* — Keith J Frisby
(74) *Attorney, Agent, or Firm* — Dickinson Wright PLLC

(57) ABSTRACT

An arrestor strap mechanism for at least one airbag module having at least one airbag, comprising at least one first arrestor strap arrangement, the first arrestor strap arrangement can be attached to an airbag, at least one second arrestor strap arrangement can be attached to an airbag, and a tensioning device with a tensioning drive, ends of the first and second arrestor strap arrangements are attached to the one tensioning device, at least one arrestor strap arrangement is deflected from the tensioning device by at least one deflection element, and as a result of the triggering of the one tensioning drive portion of the first arrestor strap arrangement can be moved over a first route and the portion of the second arrestor strap arrangement can be moved over a second route, wherein the first route and the second route are different.

11 Claims, 3 Drawing Sheets

Figure 1:
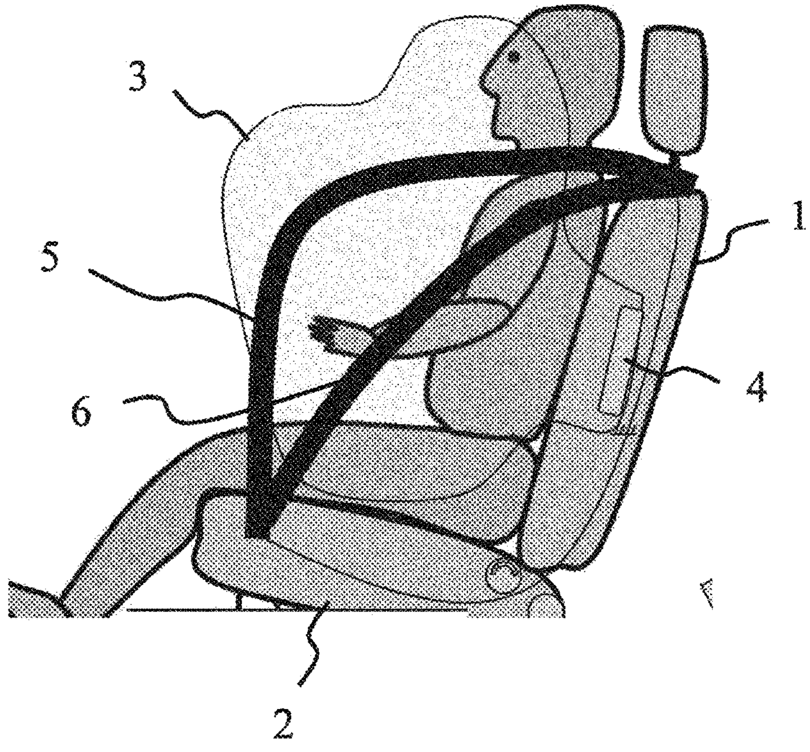

(52) U.S. Cl.
CPC ............... *B60R 2021/23146* (2013.01); *B60R 2021/23388* (2013.01)

(58) Field of Classification Search
CPC ........ B60R 21/231; B60R 2021/23386; B60R 2021/23388; B60R 2021/23146; B60R 2021/161; B60R 2021/23107; B60R 22/1954; B60R 22/1955; B60R 22/1952; B60R 22/1953; B60R 22/195
USPC ........... 280/728.1, 730.2, 733, 743.2; 701/45
See application file for complete search history.

(56) References Cited

U.S. PATENT DOCUMENTS

2010/0102617 A1* 4/2010 Eberle ................. B60R 22/1951 297/480
2010/0109306 A1* 5/2010 Dong .................. B60R 21/2338 280/743.2
2019/0248322 A1 8/2019 Herzenstiel et al.
2020/0406855 A1 12/2020 Saito et al.
2022/0274555 A1* 9/2022 Matsushita ........... B60R 21/207
2023/0012314 A1 1/2023 Matsushita et al.
2023/0311803 A1* 10/2023 Jakobs .................. B60R 21/207 701/45
2023/0356684 A1 11/2023 Söhnchen et al.
2023/0406260 A1* 12/2023 Line ........................ B60R 22/26
2025/0214527 A1* 7/2025 Ehlers ................... B60R 21/207
2025/0242777 A1* 7/2025 Schiesser ............ B60R 21/2338
2025/0276665 A1* 9/2025 Halgrin ............... B60R 21/2338

FOREIGN PATENT DOCUMENTS

DE 102018132432 A1 * 6/2020 ......... B60R 21/2338
EP 2143596 A1 1/2010
EP 3718833 A1 10/2020
JP 2001247010 A * 9/2001 ....... B60R 21/23184
WO 2021111748 A1 6/2021

* cited by examiner

TETHER MECHANISM FOR AN AIRBAG MODULE

The present invention relates to an arrestor strap mechanism for at least one airbag module having at least one airbag, comprising at least one first arrestor strap arrangement, wherein the first arrestor strap arrangement can be attached to an airbag, at least one second arrestor strap arrangement, wherein the second arrestor strap arrangement can be attached to an airbag, and a tensioning device for the arrestor strap arrangements, wherein the tensioning device comprises a tensioning drive.

Such an arrestor strap mechanism can in particular be a component of an airbag device for a vehicle seat having at least two airbag modules, wherein each airbag module comprises at least one airbag and is configured for attachment to the vehicle seat, and wherein the airbag device comprises at least one arrestor strap mechanism. The arrestor strap arrangements can be attached to an airbag in particular with their free ends that are not associated with the tensioning device. However, it is also possible for the arrestor strap arrangement to be fixed in place at one end within the motor vehicle and for a portion of the arrestor strap arrangement to be attached to the airbag between the end fixed to the motor vehicle and the tensioning device. The end of the arrestor strap arrangement can in particular be attached to a vehicle seat for a motor vehicle. In particular, the arrestor strap mechanism and the airbag device are also integrated into the vehicle seat. The invention therefore also relates to a vehicle seat for a motor vehicle, wherein the vehicle seat comprises a backrest, a seat cushion and an airbag device.

The airbag of an airbag module, which is arranged in particular in a lateral region of a backrest in the initial state, unfolds after it is triggered next to and/or in front of a passenger sitting on the vehicle seat. It can be provided that the arrestor strap arrangement guides the deployment process at least temporarily during the deployment of the airbag, for example when the arrestor strap arrangement is in a tensioned state. It is also conceivable that the arrestor strap arrangement is unwound from a spool during deployment or is tensioned from a wound or folded state by the deploying airbag.

The tightening device is provided to retract the arrestor strap arrangement during unfolding or at the end of the unfolding process and therefore to influence the unfolding process or to bring the airbag into a final position after unfolding. For example, a portion of the airbag arranged in front of the occupant after deployment can be pulled towards the backrest by the tensioning device so that the occupant is also pulled towards the backrest.

A vehicle seat having an arrestor strap mechanism is known, for example, from US 2019/0248322 A1. From US 2019/0248322 A1, for example, it is known to wind up the arrestor strap arrangement by means of the tensioning device through a rotary movement. It is also known that a tensioning device is provided for each arrestor strap arrangement and thus for each portion of an airbag attached to the arrestor strap arrangement or for each airbag, whereby the multiple arrestor strap arrangements can be tightened with a time offset relative to one another and/or can cover different tensioning paths. Therefore, a relatively large amount of equipment is necessary to differently tighten different airbags or different portions of an airbag.

The object of the present invention is therefore to at least partially eliminate the disadvantages described with respect to the prior art and, in particular, to reduce the amount of equipment in order to tighten multiple airbags or different portions of an airbag to different degrees.

A solution to the problem, and further solutions and advantageous developments, are specified in the above and below description, individual features of the advantageous developments being combinable with one another in a technically reasonable manner.

The object is achieved in particular by an arrestor strap mechanism having the features mentioned at the outset, in which one end of the first arrestor strap arrangement and one end of the second arrestor strap arrangement are attached to the one tensioning device, wherein at least one of the two arrestor strap arrangements is deflected from the tensioning device by means of at least one deflection element and in which, by triggering the one tensioning drive of the one tensioning device, the portion of the first arrestor strap arrangement attachable to the airbag is moved over a first route and the portion of the second arrestor strap arrangement attachable to the airbag is moved over a second route, wherein the first route and the second route are different.

In other words: The basic idea of the invention is that with exactly one tensioning device, different arrestor strap arrangements and thus also different regions of an airbag or different airbags can be tightened to different extents with the same tensioning device. The different routes of the tensioning process are achieved by deflecting at least one arrestor strap arrangement. Since only one tensioning device is required to realize different tensioning processes, the equipment required is reduced.

Each arrestor strap arrangement can be made from a single arrestor strap or safety rope. The arrestor strap or safety rope or the multiple arrestor straps or multiple safety ropes are made in particular of a tensile fabric. Each arrestor strap arrangement can also be made of a plurality of arrestor straps/safety ropes connected to one another. Each arrestor strap arrangement has one end which is attached to the tensioning device. The arrestor strap arrangement can have a plurality of second ends that can be connected to a portion of an airbag or to different airbags.

At least one of the arrestor strap arrangements is arranged such that the arrestor strap arrangement is deflected by the at least one deflection element at least before, after and/or during the tensioning process. The portions arranged in front of and behind the tensioning element in the direction of the arrestor strap arrangement are therefore arranged at an angle to one another. For example, the arrestor strap arrangement can be deflected by the deflection element more than 60°, preferably more than 90° or about 180°. The degree of deflection can be constant during the tightening operation, but can also change during the tightening operation. There may also be two deflection elements provided for an arrestor strap arrangement, which are arranged one behind the other in the direction of the arrestor strap arrangement, so that the arrestor strap arrangement is deflected a plurality of times.

The one arrestor strap arrangement deflected by the deflection element, the deflection element and in particular a tensioning element that can be linearly accelerated by the tensioning drive are arranged relative to one another such that the end or the portion of the deflected arrestor strap arrangement that can be attached to the airbag covers a greater route during the tensioning process than the end (or portion that can be attached to an airbag) of the other arrestor strap arrangement that can be attached to an airbag. This creates a kind of pulley system. When designing a pulley system, the tensioning path of the arrestor strap arrangement covered is greater than the path of a tensioning element covered and accelerated by the tensioning device. However, the force acting on the arrestor strap arrangement is also reduced accordingly. Therefore, if the first tensioning path of the first arrestor strap arrangement is greater than the second tensioning path of the second arrestor strap arrangement, the tensioning force of the first arrestor strap arrangement is also reduced by the same factor.

The first route is in particular 1.5 times as long as the second route, preferably more than twice or exactly twice as long as the second route.

In a first embodiment, it can be provided that a deflection element can be accelerated linearly by the tensioning drive. This means that when the tensioning process is initiated, the deflection element is in particular moved in a straight line from its initial position.

Alternatively or additionally, it can be provided that the end of the first arrestor strap arrangement and/or the end of the second arrestor strap arrangement can be accelerated by the tensioning drive, in particular linearly, i.e., in a straight line. When the tensioning process is initiated, the end of the associated arrestor strap arrangement attached to the tensioning device is preferably moved in a straight line from its initial position.

In order to linearly accelerate the deflection element, the end of the first arrestor strap arrangement and/or the end of the second arrestor strap arrangement, the tensioning device can have at least one tensioning element which can be linearly accelerated, in particular pyrotechnically, to which element the end of the first arrestor strap arrangement and/or the end of the second arrestor strap arrangement and/or the deflection element is attached.

The tensioning element can in particular be connected to a piston of a piston-cylinder unit, wherein the piston can be moved linearly with respect to the cylinder by a pyrotechnic charge.

In a first embodiment in which only precisely one tensioning element that can be linearly accelerated, is provided, a first deflection element for the first arrestor strap arrangement is attached to the one tensioning element that can be linearly accelerated, wherein the end of the first arrestor strap arrangement is fixed in place and wherein the end of the second arrestor strap arrangement is attached to the one tensioning element that can be linearly accelerated and wherein a second deflection element for the second arrestor strap arrangement is fixed in place. If a deflection of 180° is performed by the deflection elements, the tensioning path covered by the first arrestor strap arrangement is twice as long as the tensioning path covered by the second arrestor strap arrangement, since a type of pulley system is only designed for the first arrestor strap arrangement, while for the second arrestor strap arrangement only a deflection without a pulley effect occurs.

In another embodiment, it can be provided for the tensioning device to have a first tensioning element that can be linearly accelerated and a second tensioning element that can be linearly accelerated, which can be linearly accelerated, in particular pyrotechnically, in opposite directions by the one tensioning drive. Alternatively, the tensioning elements can also be accelerated in the opposite direction by means of a spring. For example, the tensioning elements can be movably arranged in an outer cylinder, wherein the tensioning elements are each connected to a rod and/or cylinder element which are telescopically arranged one inside the other, wherein a pyrotechnic charge or a spring is arranged such that the two elements can be accelerated in opposite directions within the outer cylinder.

In that case, the end of the first arrestor strap arrangement and the end of the second arrestor strap arrangement are fixed to the first tensioning element, wherein the deflection element is attached to the second tensioning element, wherein only the first arrestor strap arrangement is deflected by the deflection element. When triggered, the tensioning path of the second arrestor strap arrangement corresponds to the path covered by the first tensioning element during the tensioning process, while when the arrestor strap arrangement is deflected 180° by the deflection element, the tensioning path covered by the first arrestor strap arrangement can correspond to more than twice the path covered by the first tensioning element.

Figure 2:
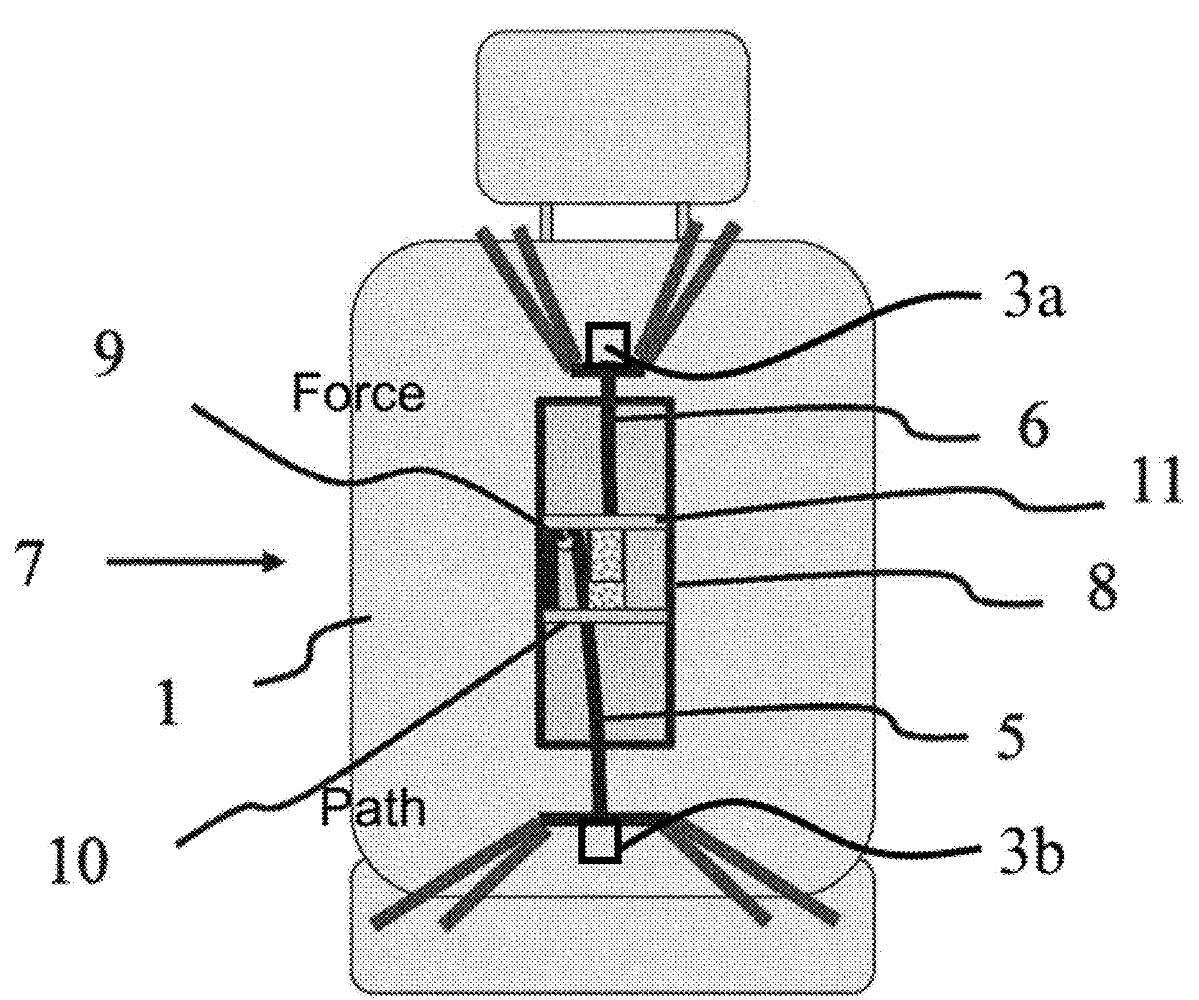
Figure 3:
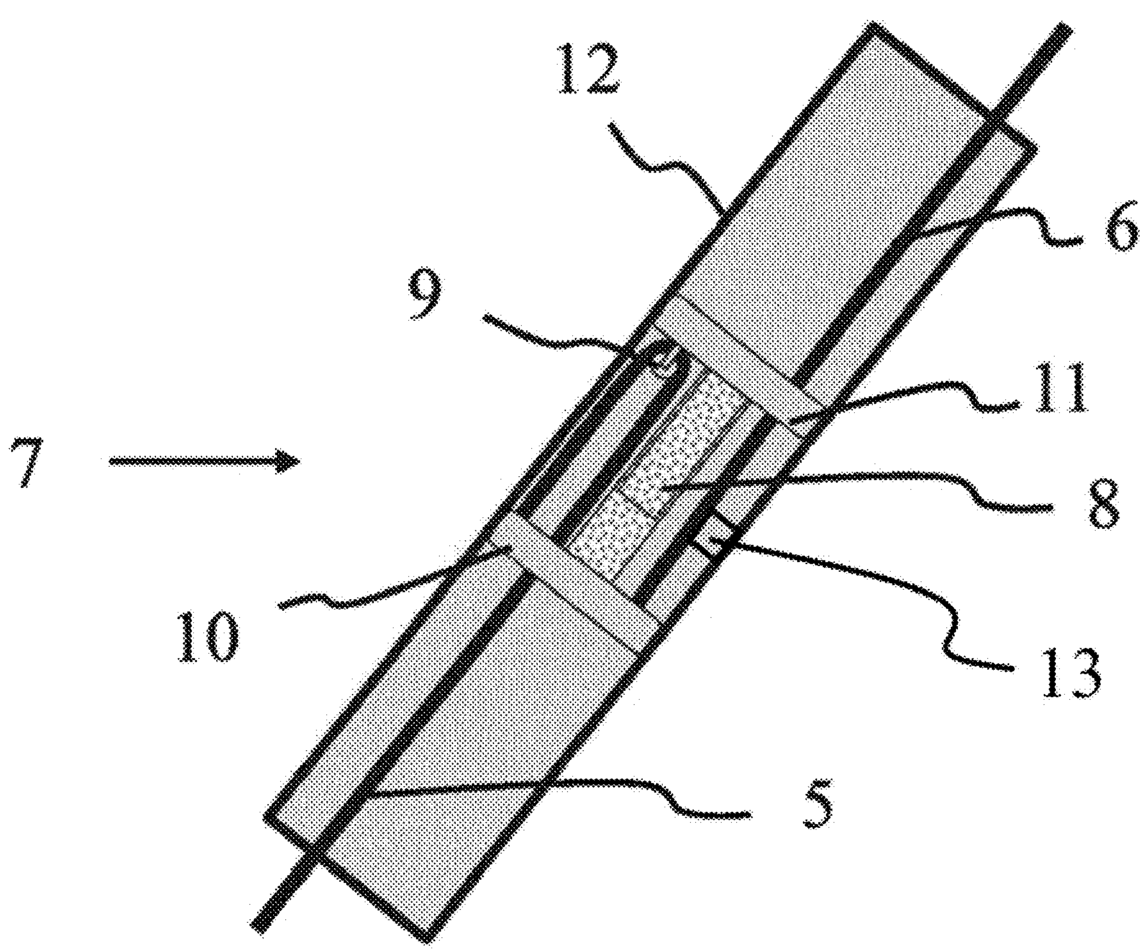

The invention and the technical environment are explained below by way of example with reference to the figures. Schematically, in the figures:

FIG. 1 shows a side view of a vehicle seat with an airbag device comprising an arrestor strap mechanism according to the invention, FIG. 2 shows a rear view of a vehicle seat with an airbag device comprising an arrestor strap mechanism according to the invention, and FIG. 3 shows a detailed view of an arrestor strap mechanism.

FIGS. 1 and 2 each show a vehicle seat with a backrest 1 and a seat cushion 2.

An airbag module with an airbag 3 and a gas generator 4 is arranged in the side regions of the backrest 1.

A first arrestor strap arrangement 5 and a second arrestor strap arrangement 6 are attached to the airbag 3 in FIG. 1. In FIG. 2, the first and second arrestor strap arrangements 5, 6 are respectively attached to two airbags **3*a*, 3*b***.

In the embodiment of FIG. 2, a tensioning device 7 is arranged in the backrest 1.

The tensioning device 7, which is also shown in FIG. 3, comprises an outer cylinder 12 in which a first tensioning element 10 and a second tensioning element 11 are movably arranged. The second tensioning element 11 is arranged telescopically with a piston-like rod element within a cylinder-like extension of the first tensioning element 10. A tensioning drive 8 is formed within this telescopic arrangement which can be realized, for example, pyrotechnically or by a pre-tensioned spring. When triggered, the first tensioning element 10 and the second tensioning element 11 can be linearly driven in opposite directions within the outer cylinder 12.

One end of the first arrestor strap arrangement 5 is fixed to the first tensioning element 10 and deflected 180° via a deflection element 9 which is attached to the second tensioning element 11.

One end of the second arrestor strap arrangement 6 is also attached to the first tensioning element 10 and is linearly guided out of the outer cylinder 12.

When triggered, the first tensioning element 10 and the second tensioning element 11 are accelerated in opposite directions within the outer cylinder 12, wherein the second arrestor strap arrangement 6 is pulled into the outer cylinder 12 by the movement of the first tensioning element 10 over the tensioning path, over which the first tensioning element 10 moves in the outer cylinder 12.

The first arrestor strap arrangement 5, on the other hand, is pulled into the outer cylinder 12 over a tensioning path which is twice as large as the change in the distance between the two tensioning elements 10 and 11.

While the arrestor straps of the first arrestor strap arrangement 5 are tightened over a much larger tensioning path, the arrestor straps of the second arrestor strap arrangement 6 experience a comparatively large tensile force.

LIST OF REFERENCE SIGNS

1 Backrest
2 Seat cushion
3 Airbag
4 Gas generator
5 First arrestor strap arrangement
6 Second arrestor strap arrangement
7 Tensioning device
8 Tensioning drive
9 Deflection element
10 First tensioning element
11 Second tensioning element
12 Outer cylinder

The invention claimed is:

1. An arrestor strap mechanism for at least one airbag module having at least one airbag, comprising:
- at least a first arrestor strap arrangement, wherein the first arrestor strap arrangement is attachable to an airbag;
- at least a second arrestor strap arrangement, wherein the second arrestor strap arrangement is attachable to the airbag; and,
- a tensioner device for the arrestor strap arrangements, wherein the tensioner device comprises a tensioner drive,
- wherein:
  - one end of the first arrestor strap arrangement and one end of the second arrestor strap arrangement are attached to the tensioner device, wherein at least one arrestor strap arrangement is deflected by the tensioner device by means of at least one deflection element; and,
  - by triggering the tensioner drive of the tensioner device, a segment of the first arrestor strap arrangement that is attachable to the airbag can be moved by a first travel distance, and a segment of the second arrestor strap arrangement that is attachable to the airbag can be moved by a second travel distance, wherein the first travel distance and the second travel distance are different.

2. The arrestor strap mechanism according to claim 1, wherein a deflection element can be linearly accelerated by the tensioner drive.

3. The arrestor strap mechanism according to claim 1, wherein the one end of the first arrestor strap arrangement and/or the one end of the second arrestor strap arrangement can be accelerated by the tensioner drive.

4. The arrestor strap mechanism according to claim 1, wherein the tensioner device has at least one tensioning element which can be accelerated pyrotechnically in a straight line.

5. The arrestor strap mechanism according to claim 4, wherein the tensioner device comprises a first tensioning element which can be accelerated in a straight line, and a second tensioning element which can be accelerated in a straight line, which first and second tensioning elements can be accelerated in opposite directions by the tensioner drive.

6. The arrestor strap mechanism according to claim 5, wherein the one end of the first arrestor strap arrangement and the one end of the second arrestor strap arrangement are fixed to the first tensioning element, and wherein the at least one deflection element is attached to the second tensioning element, wherein only the first arrestor strap arrangement is deflected by the at least one deflection element.

7. An airbag apparatus for a vehicle seat, comprising:
- at least two airbag modules, wherein each airbag module comprises at least one airbag and is configured for attachment to the vehicle seat; and,
- at least one arrestor strap mechanism according to claim 6, wherein the arrestor strap arrangements are respectively attached to an airbag.

8. The arrestor strap mechanism according to claim 4, wherein a first deflection element for the first arrestor strap arrangement is attached to the at least one tensioning element that can be linearly accelerated, and the one end of the first arrestor strap arrangement is fixed in place; and wherein the one end of the second arrestor strap arrangement is attached to the at least one tensioning element that can be linearly accelerated, and a second deflection element for the second arrestor strap arrangement is fixed in place.

9. An airbag apparatus for a vehicle seat, comprising:
- at least two airbag modules, wherein each airbag module comprises at least one airbag and is configured for attachment to the vehicle seat; and,
- at least one arrestor strap mechanism according to claim 1, wherein the arrestor strap arrangements are respectively attached to an airbag.

10. A vehicle seat for a motor vehicle, comprising:
- a backrest;
- a seat cushion; and,
- the airbag apparatus according to claim 9.

11. The vehicle seat according to claim 10, wherein the at least two airbag modules are arranged on opposite sides of the backrest.

* * * * *